US012431666B2

(12) United States Patent
Nielsen et al.

(10) Patent No.: US 12,431,666 B2
(45) Date of Patent: Sep. 30, 2025

(54) EXPANDABLE ACCORDION-STYLE CABLE OVERMOLD FOR SECURE CONNECTION

(71) Applicant: ROKU, INC., San Jose, CA (US)

(72) Inventors: Mikkel Nielsen, San Jose, CA (US); Gregory Michael Hogan, Dublin, CA (US)

(73) Assignee: Roku, Inc., San Jose, CA (US)

( * ) Notice: Subject to any disclaimer, the term of this patent is extended or adjusted under 35 U.S.C. 154(b) by 367 days.

(21) Appl. No.: 18/148,667

(22) Filed: Dec. 30, 2022

(65) Prior Publication Data

US 2024/0222909 A1 Jul. 4, 2024

(51) Int. Cl.
*H01R 13/631* (2006.01)
*H01R 13/58* (2006.01)

(52) U.S. Cl.
CPC ....... *H01R 13/631* (2013.01); *H01R 13/5845* (2013.01)

(58) Field of Classification Search
CPC ................ H01R 13/631; H01R 13/635; H01R 13/6315; H01R 13/629; H01R 13/5845; H01R 12/91
USPC ................................ 439/247, 265, 268, 246
See application file for complete search history.

(56) References Cited

U.S. PATENT DOCUMENTS 5,486,117 A * 1/1996 Chang ................. H01R 12/727 439/353
5,554,041 A * 9/1996 Lallement ............ H01R 13/631 439/247
5,591,040 A * 1/1997 Dohan ............... H01R 13/6315 439/248
6,609,923 B2 * 8/2003 Sato ................... H01R 13/2414 439/259
6,655,974 B2 * 12/2003 Nakano ................ H05K 7/1007 439/259
6,945,666 B2 * 9/2005 Woolfson .................. G01P 3/40 362/208
7,347,715 B2 * 3/2008 Kobayashi ......... H01R 13/4538 439/376
7,390,201 B1 6/2008 Quinby et al.

(Continued)

FOREIGN PATENT DOCUMENTS

CN 205303835 U 6/2016
CN 207116811 U 3/2018

(Continued)

OTHER PUBLICATIONS

Extended European Search Report for Application No. 23220491.7 mailed May 6, 2024, 11 pages.

*Primary Examiner* — Harshad C Patel
(74) *Attorney, Agent, or Firm* — Sterne, Kessler, Goldstein & Fox P.L.L.C.

(57) ABSTRACT

Disclosed herein are system, apparatus, article of manufacture, and/or method embodiments, and/or combinations and sub-combinations thereof, of an expandable overmold for a device connector such as an HDMI or USB-C connector. An example embodiment of the overmold includes an expandable connector body, an expansion mechanism for expanding the connector body, and a tensioning mechanism for applying tension to one or more surrounding device connectors connected to other ports of the computing device.

20 Claims, 7 Drawing Sheets

(56) References Cited

U.S. PATENT DOCUMENTS

| | | | | |
|---|---|---|---|---|
| 7,435,121 | B2 * | 10/2008 | Huang | G06F 3/0202 439/248 |
| 7,458,837 | B2 * | 12/2008 | Mineo | G01R 1/0416 439/248 |
| 9,252,532 | B2 * | 2/2016 | Riedel | H01R 25/14 |
| 9,312,625 | B2 * | 4/2016 | Shen | H01R 13/4534 |
| 2009/0081899 | A1 | 3/2009 | Montena | |
| 2010/0311283 | A1 | 12/2010 | Desrosiers et al. | |

FOREIGN PATENT DOCUMENTS

| | | | |
|---|---|---|---|
| CN | 208768057 | U | 4/2019 |
| CN | 209626610 | U | 11/2019 |

* cited by examiner

600

EXPANDABLE ACCORDION-STYLE CABLE OVERMOLD FOR SECURE CONNECTION

FIELD

This disclosure is generally directed to an expandable cable overmold for dynamically adjusting the size of the overmold when connected to a device port and for increasing the security of the connection by applying tension to surrounding cables.

BACKGROUND

The design of device cables (e.g., HDMI, USB-C, etc.) have remained largely unchanged—a conductive wire, insulation surrounding the conductive wire, a connector, and a overmold to cover the connector. The overmold may be any shape, typically round, rectangular, or oval, just to name a few examples. Typical device cables rely solely on friction to maintain the connection between the cable and the device port. If any one of the device (e.g., television, set-top box, laptop) or cables is accidently jostled, the cable may be knocked loose or out of the port entirely. This problem may be particularly exacerbated if the cable is frequently plugged in (and pulled out) of the device port as the strength of the friction may degrade through frequent use.

SUMMARY

Provided herein are system, apparatus, article of manufacture, and/or method embodiments, and/or combinations and sub-combinations thereof, for improving the security and reliability of the connection between a device cable and device port. For example, systems, apparatuses, and/or methods are provided for using an expandable device connector that incorporates and expandable overmold that can be adjusted to fit the particular dimensions of a port panel of electronic devices. Port panels may include one or more device ports for receiving device cables but each port panel may have different configurations for how the ports are oriented and/or positioned within the panel. For example, ports may be positioned horizontally or vertically, may be orientated horizontally or vertically, or some combination thereof. The size of the expandable overmold may be expanded to accommodate the variety of configurations such that the device connector with the expandable overmold may be in contact with one or more surrounding connectors within the port panel.

According to some embodiments, the expandable overmold may comprise a connector body that includes an expansion mechanism to increase or decrease the size of the overmold as needed and a tensioning mechanism to apply a force to one or more surrounding connectors within the port panel of an electronic device. The expansion mechanism and the tensioning mechanism may work in conjunction to dynamically size the device connector and hold the connector firmly in place when connected to an HDMI port. The expandable overmold is designed to work in combination with one or more cables connected within the port panel. In some embodiments, these one or more cables may be conventional cables that lack the expandable overmold. One of ordinary skill in the art would appreciate however that any conventional cables that are in contact with the expandable overmold with also benefit from the tension being applied by the tensioning mechanism. In this manner, a single device cable having an expandable overmold could increase the security and reliability of connections for any device cables that are in contact with the expandable overmold.

Use of the expandable overmold of the current disclosure can help improve the quality of the connection as well as the reliability of signals being transmitted through the device cable. Modification to the overmold of a device connector allows for the expandable component to compable in size to conventional device connectors when the expandable component is in an unexpanded position. And in embodiments where the expandable overmold uses similar materials as a conventional overmold, increases in costs for production over the expandable overmold are kept to a minimum.

An example embodiment includes a device connector comprising an expandable overmold covering a connector body, an expansion mechanism for increasing and decreasing the size of the overmold, and a tensioning mechanism for applying outward tension on an external surface. In some embodiments, the external surface may be the overmold of another device connector. In some embodiments, the device connector of the present disclosure may also include a locking mechanism for securing the expansion mechanism and allowing the tensioning mechanism to maintain the outward tension on the external surface.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
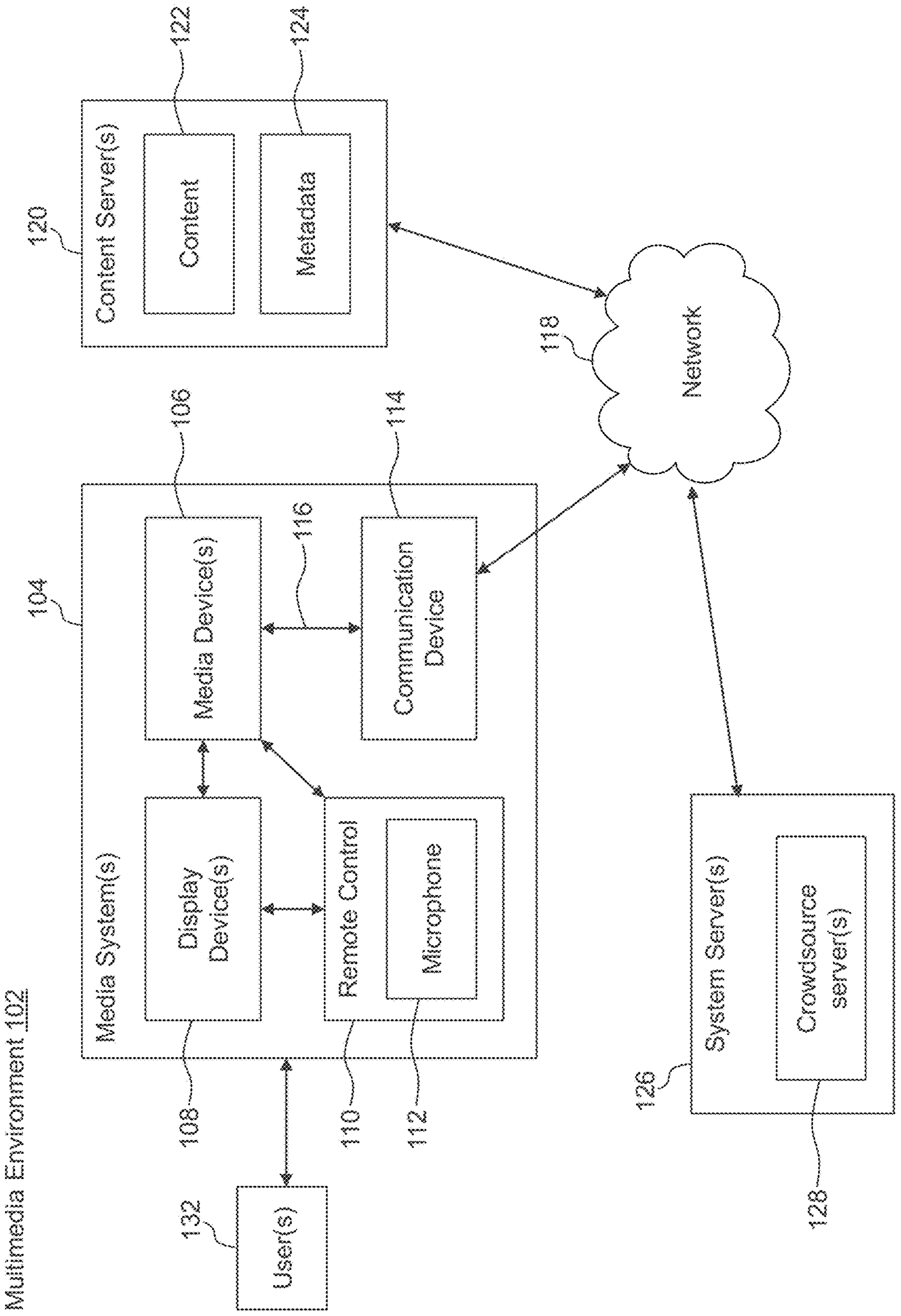
FIG. 1 illustrates a block diagram of a multimedia environment, according to some embodiments.

The present disclosure relates to a novel expandable overmold for a connector of a device cable, and more specifically, to an overmold that includes an expandable connector body that has an inner portion and an outer portion. The inner portion may be in contact with a surface of the connector, which is configured to be inserted into a device port of a computing device, such as a personal computer, a laptop, a media device, and a television, just to name a few examples. Examples of device cables include HDMI, USB-C, USB-A, just to name a few examples. The expandable overmold may further include an expansion mechanism for expanding and contracting the expandable connector body. The expansion mechanism has a first portion that is contact with or otherwise connected to the inner portion of the expandable connector body and a second portion that is in contact with or otherwise connected to the outer portion of the expandable connector body, such that the first and second portions of the expandable connector body are configured to move relative to one another to expand or contract the expandable connector body.

The expandable connector body may also include an outer surface for applying a force to surrounding connectors connected to other device ports of the device to create a tension between the outer surface and the surrounding connectors to hold the connector securely in the device port of the device. This outer surface may comprise a material such as rubber, neoprene, or silicone that has sufficient rigidity to ensure durability of the body, flexibility to be expanded or contracted into different sizes, and appropriate surface properties to maintain appropriate tension with one or more surrounding connectors.

An expandable overmold of the present disclosure solves the problems of conventional device connectors, which are typically fixed in size and shape and that rely primarily on friction between the device connector and the device port to secure the connection to the device port. Over time, especially with repeated use, the frictional properties of the device connector may degrade which can lead to loose connections and signal interference, especially when the device connectors are moved or jostled. The expandable overmold of the present invention addresses issues of conventional connectors by incorporating an expandable connector body that can be adjusted in size so that an outer portion of the overmold is in contact with one or more surrounding connectors that are also connected within the port panel of a device.

In some embodiments, the adjustment to the expandable connector body may be done by either a pushing or pulling motion on the overmold to activate an expansion mechanism that is integrated within the connector body. The expansion mechanism may be configured to allow first and second portions of the connector body to move relative to one another, increasing or decreasing the size of the connector body as needed. In some embodiments, the first portion may in contact with a surface of the connector and the second portion may in contact with and otherwise connected to an outer portion of the connector body. In some embodiments, the expansion mechanism may be a spring or elastic element that is configured to compress or decompress based on the activation of the expansion mechanism.

In some embodiments, the expandable overmold may incorporate an outer portion that applies a force to surrounding device connectors connected to the device when the expandable connector body is in an expanded state. When in the expanded state, the outer portion of the overmold may be in contact with the surrounding device connectors which uses tension with the surrounding device connectors to hold the connectors securely in place and preventing them from becoming loose or disconnected. In some embodiments, the surrounding device connectors may be conventional device connectors. In some embodiments, one or more of the surrounding connectors may utilize an expandable overmold of the present disclosure.

In some embodiments, the expandable overmold may incorporate a locking mechanism to secure the connector body in the expanded state and holding it firmly in place when connected to a device port and in contact with one or more surrounding connectors.

The expandable overmold of the present invention can be used with a variety of devices that utilize multiple device ports, including home theater systems, gaming consoles, televisions, computers, laptops, docking stations, just to name a few examples. It provides a simple and effective solution to the ensure a secure connection between a device connector and device ports, and it can help to improve the quality and reliability of the electronic signal transmitted through the cables.

Various embodiments of this disclosure may be implemented with a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102 including one or more media systems 104 that includes many devices having device ports for receiving device connectors, according to some embodiments. Multimedia environment 102 illustrates an example environment, architecture, ecosystem, etc., in which various embodiments of this disclosure may be implemented. However, multimedia environment 102 is provided solely for illustrative purposes, and is not limiting. Embodiments of this disclosure may be implemented and/or used in environments different from and/or in addition to multimedia environment 102 of FIG. 1, as will be appreciated by persons skilled in the relevant art(s) based on the teachings contained herein.

In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 can be implemented within a single location, or in distributed locations, such as in one or more of a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. For example, there may be one or more display devices 108 of media system 104 with each display device 108 being located in a separate location. User(s) 132 may operate the media system 104 to select and view content, such as content 122.

Each media system 104 may include one or more media device(s) 106 each coupled to one or more display device(s) 108. Both media device 106 and display device 108 may include multiple device ports for receiving a number of different device connectors, such as HDMI and USB-C, as the basis for coupling the media device 106 and the display device 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, a streaming set-top box (STB), cable and satellite STB, a DVD or BLU-RAY device, an audio/video playback device, a cable box, and/or a digital video recording device, to name just a few examples. Display device 108 may be a monitor, a television (TV), a computer, a computer monitor, a smart phone, a tablet, a wearable (such as a watch or glasses), an appliance, an internet of things (IoT) device, and/or a projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections. In some embodiments, communication device 114 can be a part of, integrated with, operatively coupled to, and/or connected to a respective media device 106 and/or a respective display device 108.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below. When implemented as a smartphone or tablet, operations of the remote control 110 may be provided by a software program installed on the smartphone or tablet that provide a user interface that includes controls of the remote control 110.

The multimedia environment 102 may include a plurality of content server(s) 120 (also called content providers, channels, or sources). Although only one content server 120 is shown in FIG. 1, in practice the multimedia environment 102 may include any number of content server(s) 120. Each content server 120 may be configured to communicate with network 118. Each content server 120 may be configured to communicate with network 118. Content server 120, media device 106, display device 108, may be collectively referred to as a media device, which may be an extension of media system 104. In some embodiments, a media device may include system server 126 as well.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form. Content 122 may be the source displayed on display device 108.

In some embodiments, metadata 124 comprises data about content 122. For example, metadata 124 may include closed captioning data, such as text data, associated with content 122. Metadata 124 may further include timeslots that link the closed captioning data to the audio data of content 122. The timeslots allow the display of the closed captioning data by display device 108 to be synced with the playback of audio data of content 122 such that the text provided by the closed captioning data matches the timeslot when the audio data is played such as by display device 108 or another sound playback device.

Metadata 124 may further include indicating or related to labels of the materials in the content 122, writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system server(s) 126. The system server(s) 126 may operate to support the media device(s) 106 from the cloud. It is noted that the structural and functional aspects of the system server(s) 126 may wholly or partially exist in the same or different ones of the system server(s) 126. System server(s) 126 and content server 120 together may be referred to as a media server system. An overall media device may include a media server system and media system 104. In some embodiments, a media device may refer to the overall media device including the media server system and media system 104.

The media device(s) 106 may exist in thousands or millions of media systems 104. Accordingly, the media device(s) 106 may lend themselves to crowdsourcing embodiments and, thus, the system server(s) 126 may include one or more crowdsource servers 128.

Figure 2:
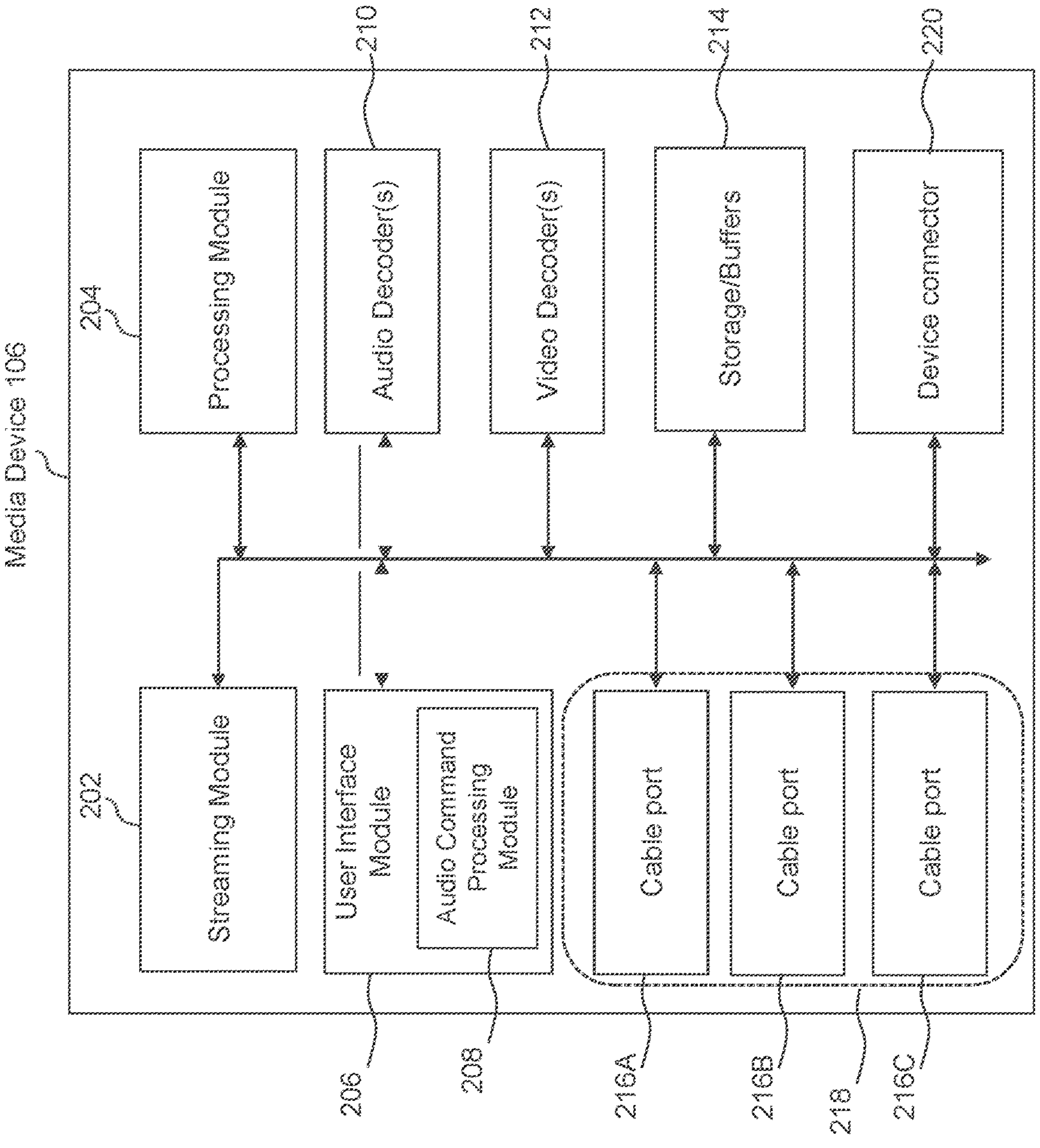
FIG. 2 illustrates a block diagram of a streaming media device having a port panel with multiple device ports, according to some embodiments.

FIG. 2 illustrates a block diagram of an example media device(s) 106, according to some embodiments. Media device(s) 106 may include a streaming module 202, processing module 204, user interface module 206, audio command processing module 208, audio decoder 210, video decoder 212, and storage/buffers 214. In some embodiments, media device 106 may include a port panel 218 with multiple cable ports 216A-218A. In some embodiments, media device 106 may include a device connector 220 for connecting media device 106 to other devices such as display device 108. In some embodiments, media device 106 may include only a device connector 220 and not include the port panel 218, such as with a streaming stick that is designed to connect to another device, such as display device 108.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

In some embodiments, the audio data received by the microphone 112 in the remote control 110 is transferred to the media device 106, which is then forwarded to the audio command processing module 208. The audio command processing module 208 may operate to process and analyze the received audio data to recognize the user 132's verbal command. In some embodiments, audio command processing module 208 may be implemented in system server 126 which may forward any analyzed audio data to media device 106 for further processing. In some embodiments, the media device 106 and the system servers 126 may cooperate to pick one of the verbal commands to process (either the verbal command recognized by the audio command processing module in the system servers 126, or the verbal command recognized by the audio command processing module 208 in the media device 106).

In some embodiments, cable ports 216A-218A may be the same type or different types. For example, one or more ports of cable ports 216A-218A may be implemented as an HDMI and/or USB-C port. In some embodiments, device connector 220 may be implemented as an HDMI or USB-C device connector.

Each audio decoder 210 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 212 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Figure 3A:
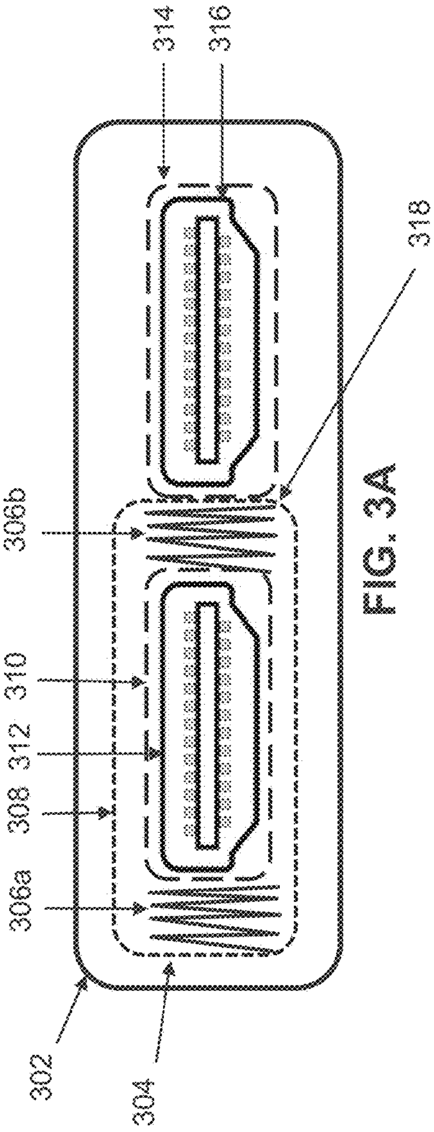
FIGS. 3A and 3B illustrates an exemplary implementation of an expandable overmold for a device cable for use in an exemplary port panel having ports positioned and oriented horizontally, according to some embodiments.
Figure 3B:
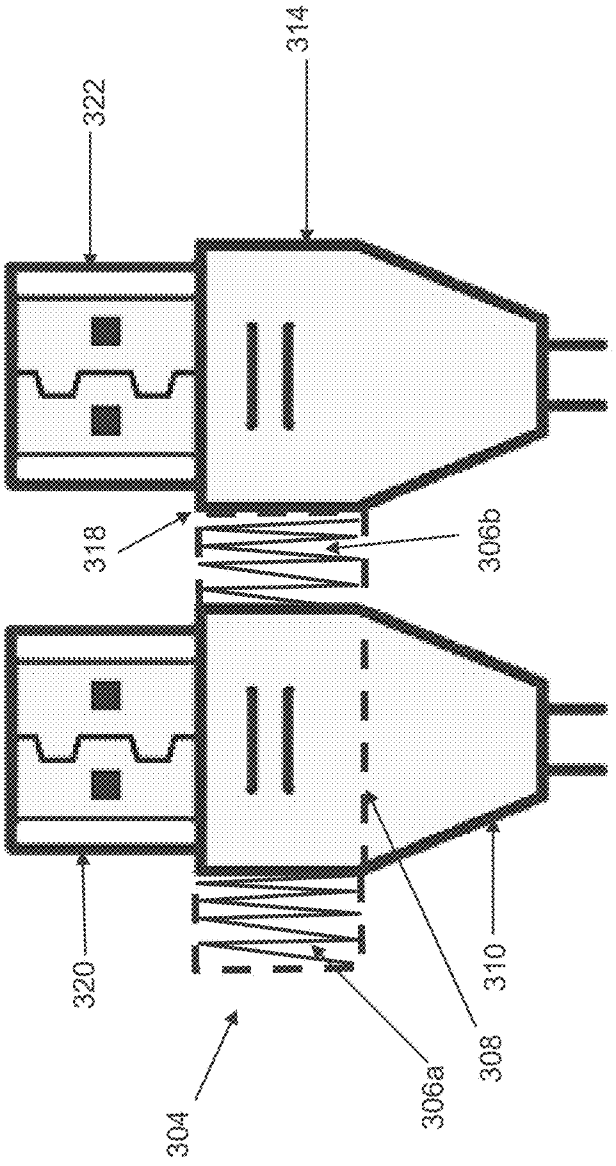

FIG. 3A illustrates an exemplary port panel 302 with a connector connected to port 312 and a connector connected to port 316, according to some embodiments. FIG. 3B illustrates a top-down view of a connector 320 implemented with an expandable overmold 304 and that is connected to port 312 and connector 322 that is connected to port 316, according to some embodiments. Elements of FIGS. 3A and 3B are discussed together. The number of ports in port panel 302 is merely exemplary and it is understood that port panel 302 may include two or more ports for receiving two or more device connectors. In some embodiments, connector 320 and connector 322 may be part of a device cable, such as an HDMI cable or a USB-C cable.

Both port 312 and port 316 are oriented and positioned horizontally. Connector 320 may be inserted into port 312 and connector 322 may be inserted into port 316 (or vice versa). Connector 320 includes a rubber cover 310 to provide a grip and protect the connector 320. Expandable overmold 304 may be positioned over at least a portion of the rubber cover 310 and is in contact with an outer surface of the rubber cover 310.

Expandable overmold 304 may include an expandable connector body 308 and an expansion mechanism 306*a* and 306*b*. Expansion mechanism 306*a* and 306*b* may be positioned on opposite ends of the expandable overmold 304 such that when expansion mechanism 306*a* and 306*b* are expanded, the size of the expandable overmold 304 is increased, and when expansion mechanism 306*a* and 306*b* is contracted, the size of the expandable overmold 304 is decreased.

Expandable connector body 308 may comprise an inner portion that is in contact with the outer surface of rubber cover 310 and an outer portion that may comprise an outer surface. The inner portion of expandable connector body 308 may be constructed from a flexible material that can be placed around rubber covers of different sizes. For example, the rubber cover of an HDMI connector is typically larger than the rubber cover of a USB-C connector. The inner portion of expandable connector body 308 may be stretched to fit these different sized connectors.

Expansion mechanism 306*a* and 306*b* are configured to expand and contract the expandable connector body. The expansion mechanism 306*a* and 306*b* may further include a first portion and a second portion. The first portion of expansion mechanism 306*a* and 306*b* may be connected to or in contact with the inner portion of the expandable connector body 308. In some embodiments, expansion mechanism 306*a* and 306*b* may be configured as a part of expandable connector body 308. In some embodiments, expansion mechanism 306*a* and 306*b* may be configured with an accordion-shape to allow for the expansion and contraction functions. The second portion of expansion mechanism 306*a* and 306*b* may be connected to or otherwise in contact with the outer portion of the expandable connector body, such that the first and second portions of expansion mechanism 306*a* and 306*b* are configured to move relative to one another to expand or contract the expandable connector body.

When expanded, a portion 318 of an outer surface of expandable connector body 308 is configured be in contact with an outer portion of overmold 314 of connector 322. Portion 318 is configured to apply a force to the overmold 314 in order to secure connector 320 in port 312 and connector 322 in port 316. FIGS. 3A and 3B depict expandable overmold 304 in contact with one connector but it is understood that it may be in contact with one or more surrounding connectors that are connected to other device ports, depending on the configuration of port panel 302. Portion 318 applying the force to connector 322 creates a tension between the outer surface of the expandable connector body 308 and the one or more surrounding connectors to hold the connector securely in the device port of the device.

Because port 312 and port 316 are positioned vertically from each other, portion 318 of the outer surface of expandable connector body 308 is located on right-side portion of expandable connector body 308 (when connector 320 is inserted into port 312) or the left-side portion of expandable connector body 308 (when connector 320 is inserted into port 316).

In some embodiments, the expansion mechanism 306*a* and 306*b* may comprise an accordion shape and made of a spring or elastic element, or other deformable element, that is connected to or an extension of the expandable connector body 308, such that when the spring or elastic element is expanded, the expansion mechanism 306*a* and 306*b* also expands to cause the outer surface to apply a force to one or more surrounding connectors. The deformable nature of expansion mechanism 306*a* and 306*b* allow the expandable connector body 308 to be configured in a contracted shape around rubber cover 310 or in an expanded shape. This applied force holds both connector 320 and 322 securely in place in the respective ports. When the spring or elastic element is contracted, the accordion shape contracts causing the expansion mechanism 306*a* and 306*b* to also contract and reduce in size around rubber cover 310.

In some embodiments, the expansion mechanism 306*a* and 306*b* may be configured to be activated by a pulling motion on the expansion mechanism 306*a* and 306*b*. For example, a user may place his fingers around an outer surface of expandable overmold 304 and cause the expansion mechanism 306*a* and 306*b* to expand by a pulling force on one or both sides of the expandable overmold 304.

In some embodiments, the expandable overmold 304 may include a locking mechanism for securing the first and second portions of the expansion mechanism in a desired position, such that the expandable connector body 308 is held in a fixed shape when it is in the expanded state.

One of ordinary skill in the art would understand that different materials may be used with the properties to achieve the functions described herein. For example, expandable connector body 308 may be made of polycarbonate, ABS plastic, or PVC. These materials are strong, durable, and flexible, which makes them well-suited for use in an expandable overmold expands and contracts. The outer surface of the expandable connector body 308, such as the portion 318 that is in contact with one or more surrounding connectors may be constructed of materials like rubber, neoprene, or silicone which are elastic and flexible, allowing them to stretch and apply tension to surrounding connectors without breaking or losing their shape.

Figure 4B:
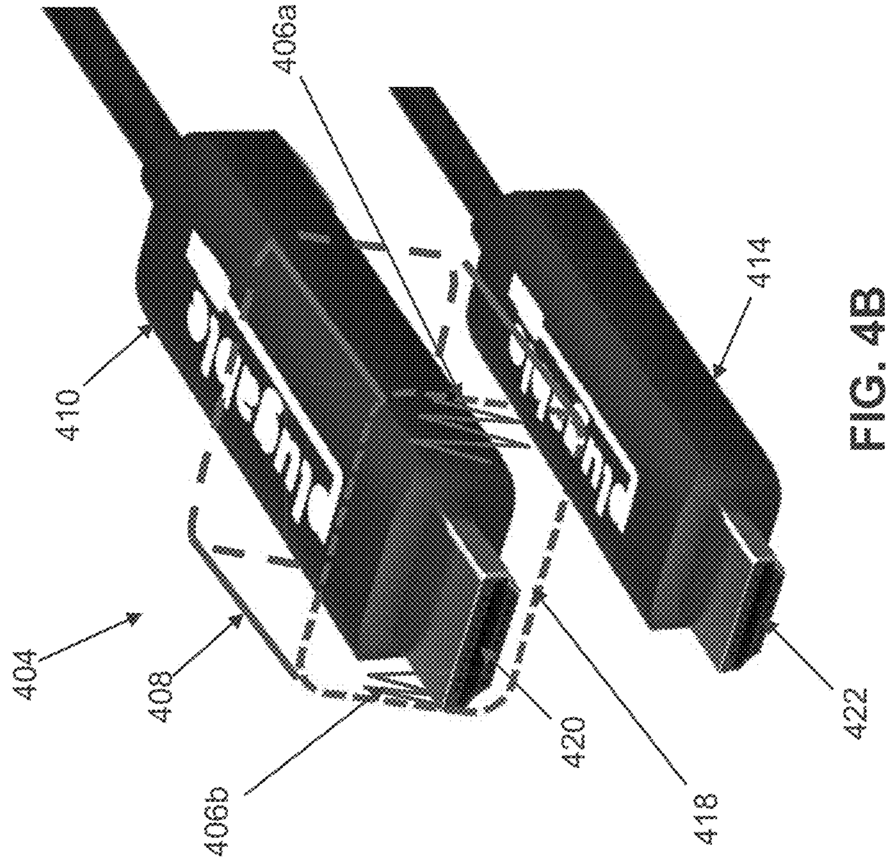
FIGS. 4A and 4B illustrates an exemplary implementation of an expandable overmold for a device cable for use in an exemplary port panel having ports positioned vertically and oriented horizontally, according to some embodiments.
Figure 4A:
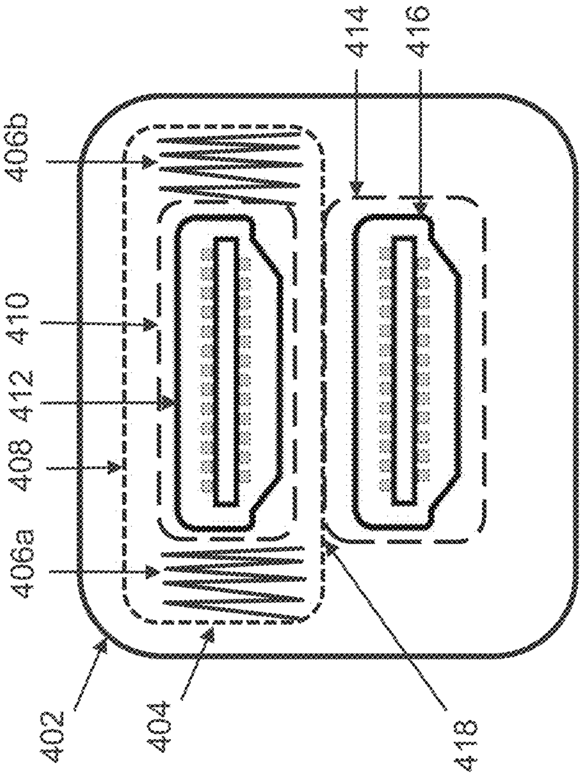

FIG. 4A illustrates an exemplary port panel 402 with a connector connected to port 412 and a connector connected to port 416, according to some embodiments. FIG. 4B illustrates a view of connector 420 implemented with an expandable overmold 404 connected to port 412 and connector 422 connected to port 416, according to some embodiments. Elements of FIGS. 3A and 3B are discussed together. The number of ports in port panel 402 is merely exemplary and it is understood that port panel 402 may include two or more ports for receiving two or more device connectors.

Port panel 402 is similar to port panel 302 with port 412 and port 416 oriented horizontally. However, port 412 and port 416 are positioned vertically in relation to each other. Other elements of port panel 402 and expandable overmold 404 function similar to port panel 302 and expandable overmold 304, as described above.

For example, expandable overmold 404 includes expansion mechanism 406*a* and 406*b* and expandable connector body 408 that is configured to be in contact with rubber cover 410 of connector 420. When expanded, a portion 418 of an outer surface of expandable connector body 408 is in contact with and applies a force to overmold 414 of connector 422.

Because port 412 and port 416 are positioned vertically from each other, portion 418 of the outer surface of expandable connector body 408 is located on the lower portion of expandable connector body 408 (when connector 420 is inserted into port 412) or the upper portion of expandable connector body 408 (when connector 420 is inserted into port 416).

Figure 5:
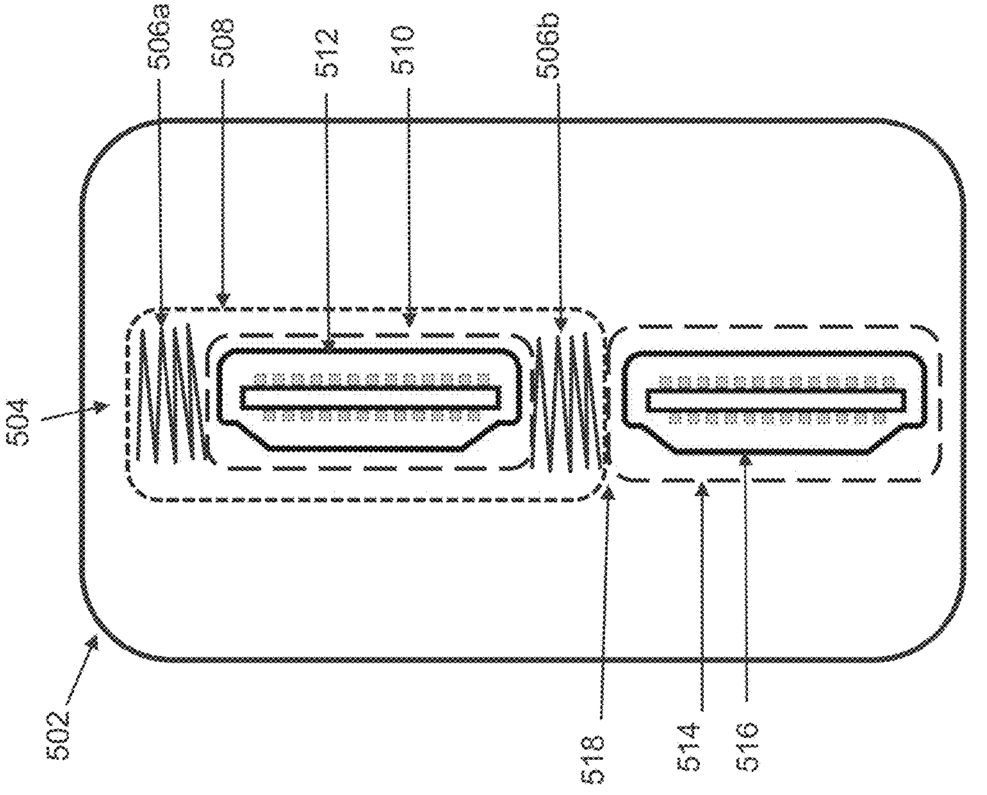
FIG. 5 illustrates an exemplary implementation of an expandable overmold for a device cable for use in an exemplary port panel having ports positions and oriented vertically, according to some embodiments.

FIG. 5 illustrates an exemplary port panel 502 with a connector connected to port 512 and a connector connected to port 516, according to some embodiments.

Port panel 502 is similar to port panel 402 with port 512 and port 516 positioned vertically in relation to each other. However, port 512 and port 516 are oriented vertically in relation to each other. Other elements of port panel 502 and expandable overmold 504 function similar to port panel 302 and expandable overmold 304, as described above. For example, expandable overmold 504 includes expansion mechanism 506*a* and 506*b* and expandable connector body 508 that is configured to be in contact with overmold 514 of a connector that is inserted into port 516. When expanded, a portion 518 of an outer surface of expandable connector body 508 is in contact with and applies a force to the overmold 514 of connector in port 516.

Because port 512 and port 516 are oriented and positioned vertically, portion 518 of the outer surface of expandable connector body 408 is located on a right side portion of expandable connector body 508 (when a connector is inserted into port 512) or the left side portion of expandable connector body 508 (when a connector is inserted into port 516).

Figure 6:
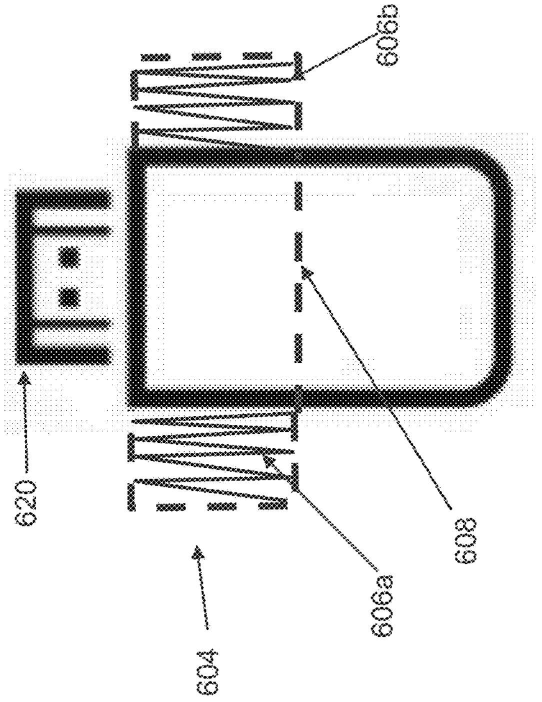
FIG. 6 illustrates an exemplary implementation of an expandable overmold for a media device, according to some embodiments.

FIG. 6 illustrate a top-down view of a media device 600 implemented with an expandable overmold 604 and connector 620, according to some embodiments. In contrast to FIGS. 3-5, expandable overmold 604 is implemented on a device and not a cable connector. Media device 600 may be implemented as, for example, a streaming stick that is configured to connect to a display device, such as display device 106, via connector 620. Expandable overmold 604 may include expansion mechanism 606*a* and 606*b* and expandable connector body 608 which may function similarly to expansion mechanism 306*a* and 306*b* and expandable connector body 308, as discussed above. The inner portion of expandable connector body 608 may be comprised of a flexible material that can accommodate media devices of different sizes.

Example Computer System

Figure 7:
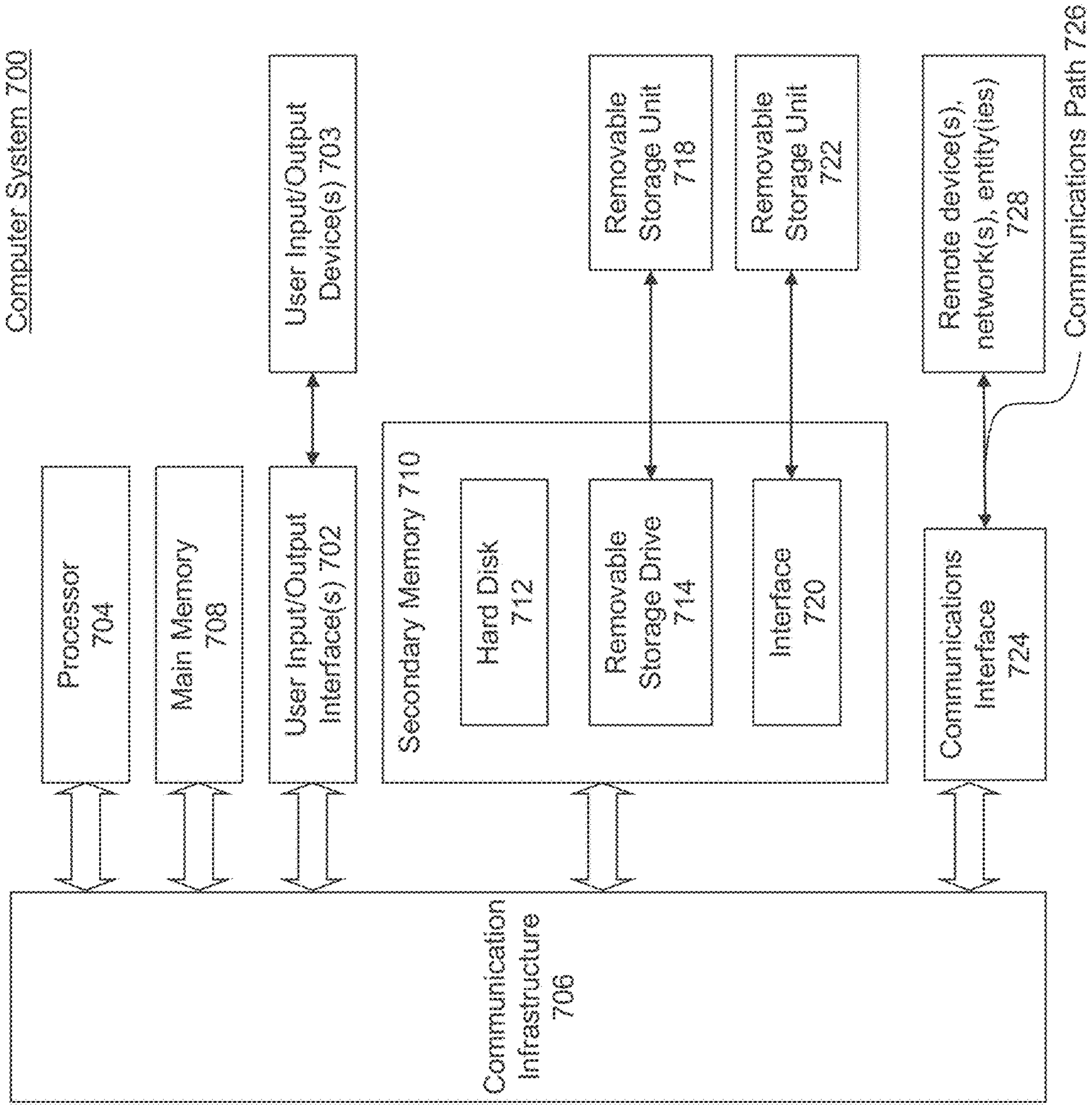
FIG. 7 illustrates an example computer system useful for implementing various embodiments.

Various embodiments of the expandable overmold may be implemented, for example, to connect one or more well-known computer systems, such as computer system 700 shown in FIG. 7. For example, the expandable overmold 304 may be implemented to connect to one or more device ports of computer system 700.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702. Computer system 700 may comprise one or more device ports to receive one or more device connectors of user input/output device(s) 703.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. An expandable overmold for a connector of a device cable configured to be connected to a port of a computing device, comprising:

an expandable connector body, comprising an inner portion and an outer portion, the inner portion in contact with a surface of the connector;

an expansion mechanism for expanding and contracting the expandable connector body, wherein the expansion mechanism comprises a first portion and a second portion, the first portion connected to the inner portion of the expandable connector body, and the second portion connected to the outer portion of the expandable connector body, such that the first and second portions are configured to move relative to one another to expand or contract the expandable connector body; and an outer surface for applying a force to one or more surrounding connectors connected to other device ports of the computing device to create a tension between the outer surface and the one or more surrounding connectors to hold the connector securely in the port of the computing device.

2. The expandable overmold of claim 1, wherein the expansion mechanism comprises at least one spring or elastic element connected to the expandable connector body, such that when the at least one spring or elastic element is expanded, the outer surface applies the force to the one or more surrounding connectors.

3. The expandable overmold of claim 2, wherein the at least one spring or elastic element is configured to be activated by a pulling motion on the expansion mechanism.

4. The expandable overmold of claim 1, wherein the outer surface comprises one of rubber, neoprene, or silicone.

5. The expandable overmold of claim 1, wherein the device cable is an HDMI cable and the port of the computing device is an HDMI port.

6. The expandable overmold of claim 1, wherein the device cable is a USB-C cable and the port of the computing device is a USB-C port.

7. The expandable overmold of claim 1, wherein the device cable is a USB-A cable and the port of the computing device is a USB-A port.

8. The expandable overmold of claim 1, further comprising:

a locking mechanism for securing the first and second portions of the expansion mechanism in a desired position, such that the expandable connector body is held in a fixed shape.

9. The expandable overmold of claim 1, wherein the expansion mechanism comprises an accordion material that is deformable such that the expandable connector body may be configured between a contracted shape and an expanded shape.

10. The expandable overmold of claim 9, wherein the outer surface applies the force when the expandable connector body is in the expanded shape.

11. An expandable overmold for a connector of a media device configured to be connected to a port of a display device, comprising:

an expandable connector body, comprising an inner portion and an outer portion, the inner portion in contact with a surface of the connector;

an expansion mechanism for expanding and contracting the expandable connector body, wherein the expansion mechanism comprises a first portion and a second portion, the first portion connected to the inner portion of the expandable connector body, and the second portion connected to the outer portion of the expandable connector body, such that the first and second portions are configured to move relative to one another to expand or contract the expandable connector body; and an outer surface for applying a force to one or more surrounding connectors connected to other device ports of the display device to create a tension between the outer surface and the one or more surrounding connectors to hold the connector securely in the port of the display device.

12. The expandable overmold of claim 11, wherein the expansion mechanism comprises at least one spring or elastic element connected to the expandable connector body, such that when the at least one spring or elastic element is expanded, the outer surface applies the force to the one or more surrounding connectors.

13. The expandable overmold of claim 12, wherein the at least one spring or elastic element is configured to be activated by a pulling motion on the expansion mechanism.

14. The expandable overmold of claim 11, wherein the outer surface comprises one of rubber, neoprene, or silicone.

15. The expandable overmold of claim 11, wherein the connector is an HDMI cable and the port of the display device is an HDMI port.

16. The expandable overmold of claim 11, wherein the connector is a USB-C cable and the port of the display device is a USB-C port.

17. The expandable overmold of claim 11, wherein the connector is a USB-A cable and the port of the display device is a USB-A port.

18. The expandable overmold of claim 11, further comprising:

a locking mechanism for securing the first and second portions of the expansion mechanism in a desired position, such that the expandable connector body is held in a fixed shape.

19. The expandable overmold of claim 11, wherein the expansion mechanism comprises an accordion-style material that is deformable such that the expandable connector body may be configured between a contracted shape and an expanded shape.

20. The expandable overmold of claim 19, wherein the outer surface applies the force when the expandable connector body is in the expanded shape.

* * * * *